United States Patent
Horiuchi et al.

(10) Patent No.: US 8,494,720 B2
(45) Date of Patent: Jul. 23, 2013

(54) VEHICLE MOTION STABILITY CONTROL SYSTEM

(75) Inventors: Yutaka Horiuchi, Wako (JP); Takashi Yanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 12/921,883

(22) PCT Filed: Jan. 30, 2009

(86) PCT No.: PCT/JP2009/000356
§ 371 (c)(1),
(2), (4) Date: Sep. 10, 2010

(87) PCT Pub. No.: WO2009/113232
PCT Pub. Date: Sep. 17, 2009

(65) Prior Publication Data
US 2011/0029202 A1    Feb. 3, 2011

(30) Foreign Application Priority Data

Mar. 11, 2008  (JP) .................................. 2008-060698

(51) Int. Cl.
*G05D 1/00*     (2006.01)
*G06F 7/00*     (2006.01)
*G06F 17/00*    (2006.01)

(52) U.S. Cl.
USPC ............................................. 701/42; 701/48

(58) Field of Classification Search
USPC .................. 701/42, 36, 41, 48; 180/197, 410, 180/413
See application file for complete search history.

(56) References Cited

U.S. PATENT DOCUMENTS

| | | | |
|---|---|---|---|
| 2002/0022916 A1* | 2/2002 | Akita | ............................. 701/42 |
| 2002/0143451 A1 | 10/2002 | Hac et al. | |

FOREIGN PATENT DOCUMENTS

| | | |
|---|---|---|
| DE | 10356509 A1 | 7/2005 |
| EP | 1288107 A2 | 3/2003 |
| JP | 3179271 | 6/2001 |
| JP | 3214824 | 10/2001 |
| JP | 2004148891 | 5/2004 |
| WO | 2009/113232 A1 | 9/2009 |

OTHER PUBLICATIONS

Machine Translation of DE 10356509.*

\* cited by examiner

*Primary Examiner* — Thomas Tarcza
*Assistant Examiner* — Kevin Myhre
(74) *Attorney, Agent, or Firm* — Rankin, Hill & Clark LLP

(57) ABSTRACT

Provided is a vehicle motion stability control system that combines the VSA and RTC devices in a favorable manner, and is able to effectively control the behavior of the vehicle over an entire operating range including an extreme operating region and a normal operating region. An output of the RTC is transformed by a certain transfer function, and the front wheel steering angle $\delta_f$ inputted to the actual vehicle model for the first control device (VSA) is modified according to the output of the transfer function. It means that the input front wheel steering angle is modified according to the thrust angle or toe angle of the RTC. Thereby, a harmonized control of the VSA and RTC is enabled, and such a harmonized combination can be effected without making changes to the structure of an existing VSA.

5 Claims, 3 Drawing Sheets

VEHICLE MOTION STABILITY CONTROL SYSTEM

TECHNICAL FIELD

The present invention relates to a vehicle motion stability control system including a first control (VSA) device that controls the distribution of a braking force and/or traction force of the front and/or rear wheels using at least a front wheel steering angle for a control input and a second control device (RTC) that controls a steering angle of the rear wheels using at least a front wheel steering angle for a control input.

BACKGROUND OF THE INVENTION

The vehicle stability assist device (VSA) is known as a control device for stabilizing the handling of a vehicle. See patent document 1 (Japanese patent No. 3214824). Such a device is capable of restoring a disturbed behavior of a vehicle to a normal behavior by automatically braking the right and left wheels or front and rear wheels and using the braking force as a balancing force. This is typically accomplished by feeding back a deviation of the actual vehicle motion from a reference vehicle motion. In particular, patent document 1 discloses how a steering input which a vehicle operator intentionally applies may be restricted according changes in a side slip angle velocity obtained from a lateral acceleration.

Also is proposed the rear wheel toe angle control device (RTC) which may be used as a four wheel steering device that stabilizes the motion of the vehicle by steering the rear wheels so as to reduce the side slip angle of the vehicle to zero or a prescribed value as disclosed in Japanese patent No. 3179271 (patent document 2). There are a variety of approaches that can be used for such a purpose, and one of them is based on the changing of a steering angle ratio between the front and rear wheels depending on the vehicle speed (opposite phase in a low speed range and same phase in a high speed range). Such a control process, be it an RTC or 4WS, basically relies on a feed forward control that minimizes a deviation of a yaw rate response of an actual vehicle model to a steering input from a yaw response of an ideal vehicle model to the same steering input.

Because the VSA produces a yaw moment by distributing a braking force to different wheels, in theory, it can perform its function even in an operating region where the side slip angle of a wheel has exceeded a limit value. However, as it cannot be tolerated to apply the brake too often in practical applications, the VSA is typically activated only when the vehicle is under an extreme condition. On the other hand, as the RTC produces a yaw moment by causing a small side slip angle to the rear wheels, it is suited to be used in a normal operating range. Therefore, a combination of the VSA and RTC can produce a vehicle motion stability control system that is effective over an entire operating range. However, as the VSA and RTC are based on feedback and feed forward control principles, respectively, these two control devices may interfere with each other when they are activated at the same time, and it may cause an unstable behavior of the vehicle.

BRIEF SUMMARY OF THE INVENTION

In view of such problems of the prior art, a primary object of the present invention is to provide a vehicle motion stability control system which combines the VSA and RTC devices in a favorable manner, and is able to effectively control the behavior of the vehicle over an entire operating range including an extreme operating region and a normal operating region.

A second object of the present invention is to provide a vehicle stability control system which can combine the VSA and RTC devices as two separate, individually designed devices.

A third object of the present invention is to provide a vehicle stability control system which can combine the VSA and RTC devices without requiring them to be modified for the combined use.

According to the present invention, such an object can be accomplished by providing a vehicle motion stability control system, comprising: a first control device (VSA) that controls a distribution of a braking force and/or traction force of front and/or rear wheels using at least a front wheel steering angle for a control input; a second control device (RTC) that controls a steering angle of the rear wheels using at least a front wheel steering angle for a control input; and a harmonizing control unit that modifies the control input to the first control device according to a control output of the second control device.

The output of the second control device (RTC) is transformed by a prescribed transfer function, and the front wheel steering angle $\delta_f$ inputted to the actual vehicle model for the first control device (VSA) is modified according to the output of the transfer function. It means that the input front wheel steering angle is modified according to the thrust angle or toe angle of the RTC. Thereby, a harmonized control of the VSA and RTC is enabled, and such a harmonized combination can be effected without making changes to the structure of an existing VSA.

According to a preferred embodiment of the present invention, the first control device (VSA) determines the distribution of a braking force and/or traction force of front and/or rear wheels according to a deviation between outputs of an actual vehicle model and an actual vehicle to a given front wheel steering angle, and the second control device (RTC) determines the rear wheel steering angle according to a deviation between outputs of an actual vehicle model and an actual vehicle to a given front wheel steering angle, the harmonizing control unit modifying the control input to the actual vehicle model of the first control device according to the control output of the second control device. The harmonizing control unit may add or subtract a correction signal based on the control output of the second control device to or from the control input of the actual vehicle model of the first control device, and the control output of the second control device may include a yaw rate of the vehicle.

The second control device (RTC) may be configured to use a thrust angle of the rear wheels or a toe angle of the rear wheels.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
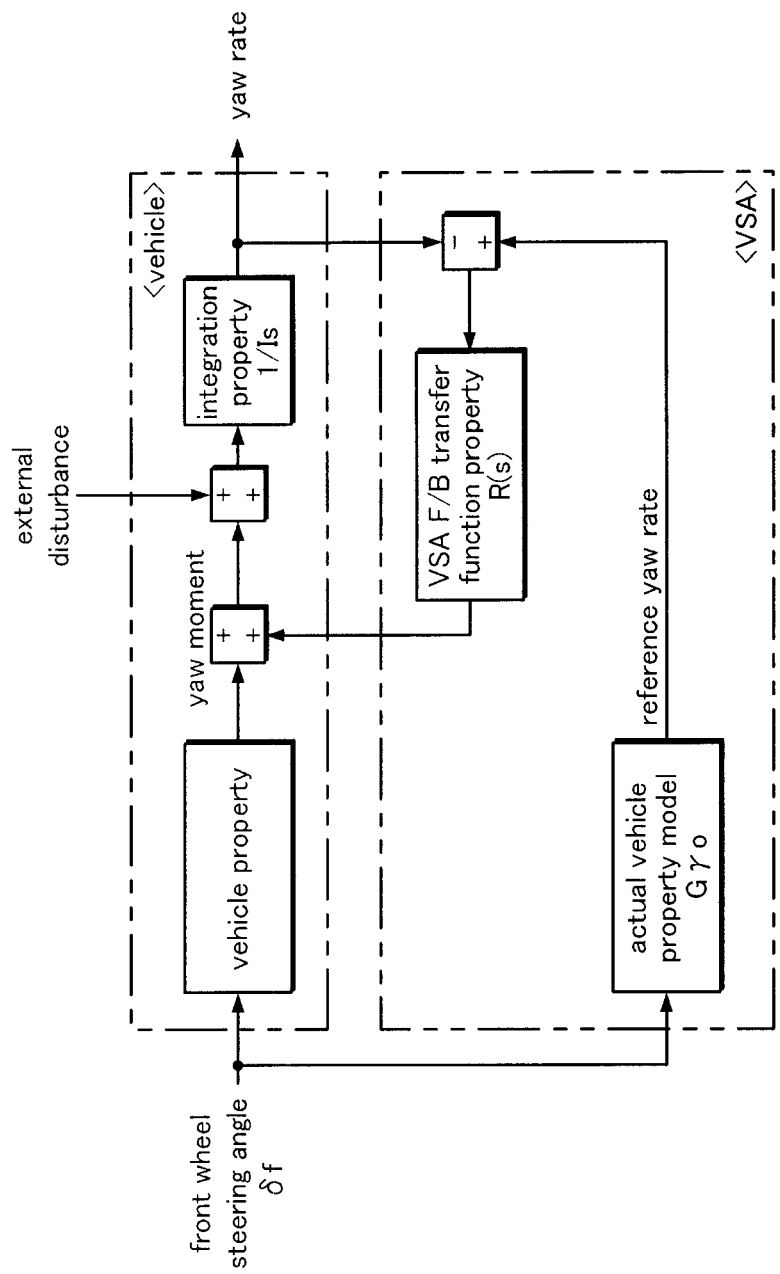
FIG. 1 is a block diagram of a conventional VSA device.

FIG. 1 is a block diagram of a VSA device. As a front wheel steering angle $\delta_f$ is inputted to an actual vehicle model ($G_{y0}$ (s)), a reference yaw rate is produced by the actual vehicle model. A deviation of an actual yaw rate from the reference yaw rate is forwarded to a VSA feedback (F/B) transfer function property (R(s)), which then determines a distribution ratio of the traction force or braking force to the different wheels so that a desired additional yaw moment may be applied to the vehicle. As a result, a sum of the yaw moment caused by a front wheel steering angle and the added yaw moment caused by the VSA system acts upon the vehicle body, and an integrated value of the sum of the yaw moments is given as an actual yaw rate of the vehicle. Thereby, even when a yaw moment caused by an external disturbance acts upon the vehicle, the feedback action of the control system ensures a motion stability of the vehicle.

Figure 2:
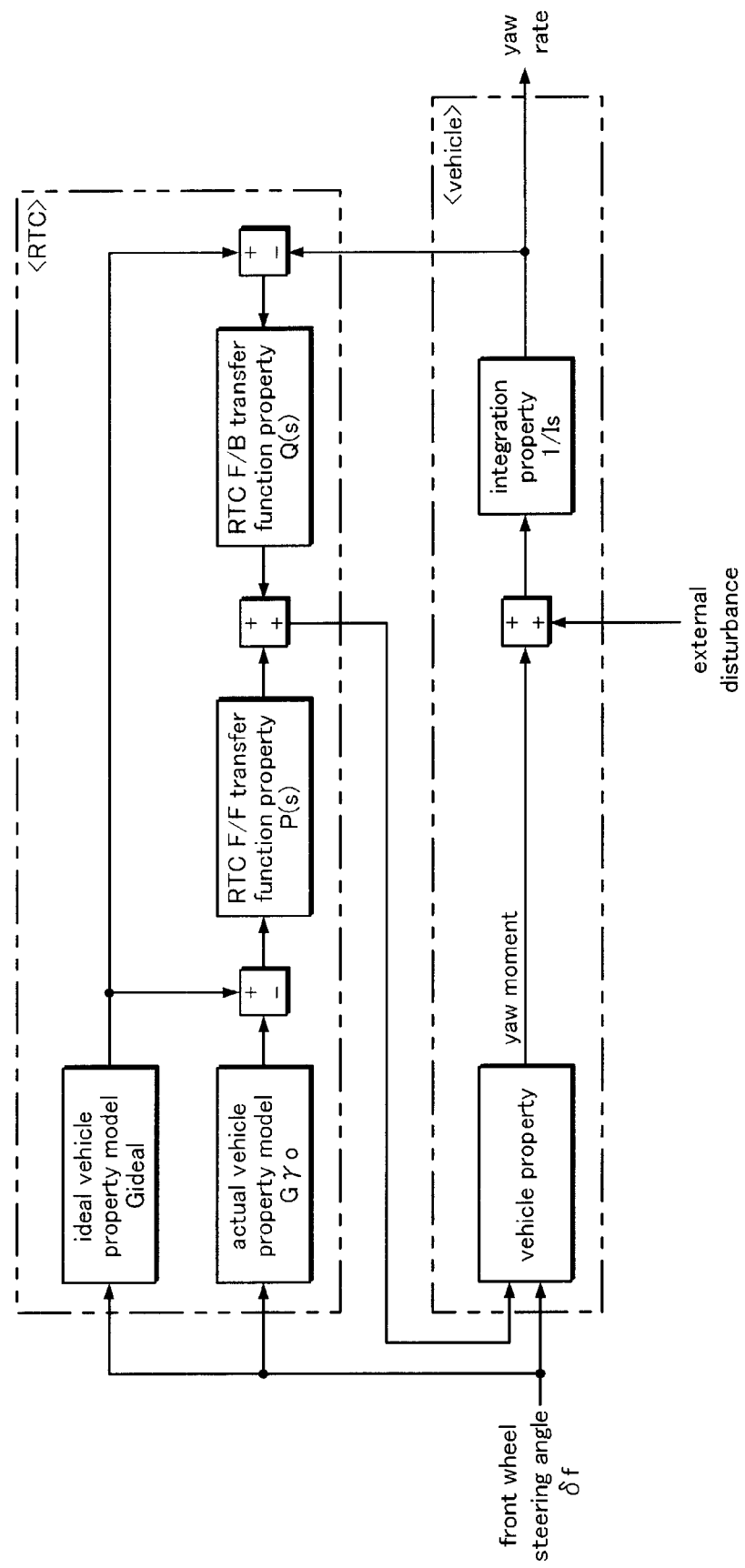
FIG. 2 is a block diagram of a conventional RTC device.

FIG. 2 is a block diagram of a RTC device. As a front wheel steering angle $\delta_f$ is inputted to both an actual vehicle model ($G_{y0}(s)$) and an ideal vehicle model ($G_{ideal}(s)$), a deviation between the outputs of the two models is forwarded to a RTC feed forward (F/F) transfer function property (P(s)). Then, a deviation between the output (yaw rate) of the ideal vehicle model and the output (yaw rate) of the actual vehicle is forwarded to a RTC feedback (F/B) transfer function property (Q(s)). The sum of the outputs of the RTC feed forward transfer (F/F) function property (P(s)) and RTC feedback (F/B) transfer function property (Q(s)) is applied to the vehicle as an added yaw moment. Thus, the actual yaw rate of the vehicle is given as an integrated value of the sum of the yaw moment caused by the front wheel steering angle and added yaw moment. In this case, even when a yaw moment caused by an external disturbance acts upon the vehicle, not only the dynamic stability of the vehicle is ensured owing to the feedback action of the control system but also a high responsiveness can be achieved without compromising the dynamic stability of the vehicle owing to the feed forward control action using the behavior of an ideal vehicle model as a reference.

As discussed in WO08/047,481, if the transfer function property for the rear toe angle control is given by $\delta r = Gr \cdot \delta f$, the equation of motion of the vehicle can be represented as given in the following:

$$\begin{bmatrix} m \cdot V \cdot s + (K_f + K_r) & mV + \dfrac{L_f \cdot K_f - L_r \cdot K_r}{V} \\ L_f \cdot K_f - L_r \cdot K_r & I \cdot s + \dfrac{L_f^2 \cdot K_f - L_r^2 \cdot K_r}{V} \end{bmatrix} \cdot \begin{bmatrix} \beta \\ \gamma \end{bmatrix} = \begin{bmatrix} K_f + Gr \cdot K_r \\ L_f \cdot K_f - Gr \cdot L_r \cdot K_r \end{bmatrix} \cdot \delta_f$$

The steering angle of the rear wheels $\delta r$ can then be given by the following equation.

$$\delta_r = -\dfrac{\dfrac{m \cdot l_f}{k_r \cdot l} V \cdot s + 1}{\dfrac{m \cdot l_r}{k_f \cdot l} V \cdot s + 1} \cdot \dfrac{1}{G_{y0}} (G_{ideal} - G_{y0}) \cdot \delta_f \quad (1)$$

where m: vehicle mass, l: wheel base, lf, lr: distances of front and rear axles from the gravitational center, $\delta f$: front wheel steering angle, kr, kf: cornering powers of front and rear wheels, and V: vehicle speed. $G_{ideal}(s)$ represents the ideal vehicle model in FIG. 2, and $G_{y0}(s)$ represents the actual vehicle model when $\delta r=0$.

From Equation (1) and FIG. 2, the feed forward transfer function property P(s) is given by the following equation:

$$-\dfrac{\dfrac{m \cdot l_f}{k_r \cdot l} V \cdot s + 1}{\dfrac{m \cdot l_r}{k_f \cdot l} V \cdot s + 1} \cdot \dfrac{1}{G_{y0}} \quad (2)$$

In FIG. 2, the added yaw moment that is applied to the vehicle is given as a product of the rear wheel steering angle $\delta r$ and lr. Therefore, the output of the RTC may be represented as $\delta r$ for the convenience of description.

It is explained in the following why the behavior of the vehicle could become unstable when the VSA and RTC are simply combined. The VSA and RTC rely on vehicle models as references for feedback control. In particular, the VSA relies on an actual vehicle model while the RTC relies on an ideal vehicle model. The actual vehicle model is based on the behavior of a vehicle not equipped with any VSA or other vehicle stability control device while the ideal vehicle model is based on the behavior of a vehicle equipped with a RTC or other device that can change the dynamic properties of the vehicle, and these two models normally differ from each other. Therefore, the VSA cancels the yaw moment produced by the RTC in an attempt to change the dynamic properties of the vehicle as an external disturbance. Similarly, the yaw moment produced by the VSA is canceled by the RTC as an external disturbance in executing a feedback control using the ideal vehicle model. This is why combining a vehicle motion stability control device with a VSA could cause an unstable motion of the vehicle.

Such a problem can be resolved by adapting the actual vehicle model for the VSA to the ideal vehicle model for the RTC, or by adapting the ideal vehicle model for the RTC to the actual vehicle for the VSA. However, in the latter case, the RTC becomes unable to execute a feed forward control using the ideal vehicle model as a reference. In the former case, it is necessary to change the configuration of the controller for the VSA designed for a specific vehicle, and this necessitates the settings of the VSA to be changed depending on if the vehicle is equipped with a RTC or not, thereby requiring a substantial amount of work in setting up the VSA for the given RTC.

Figure 3:
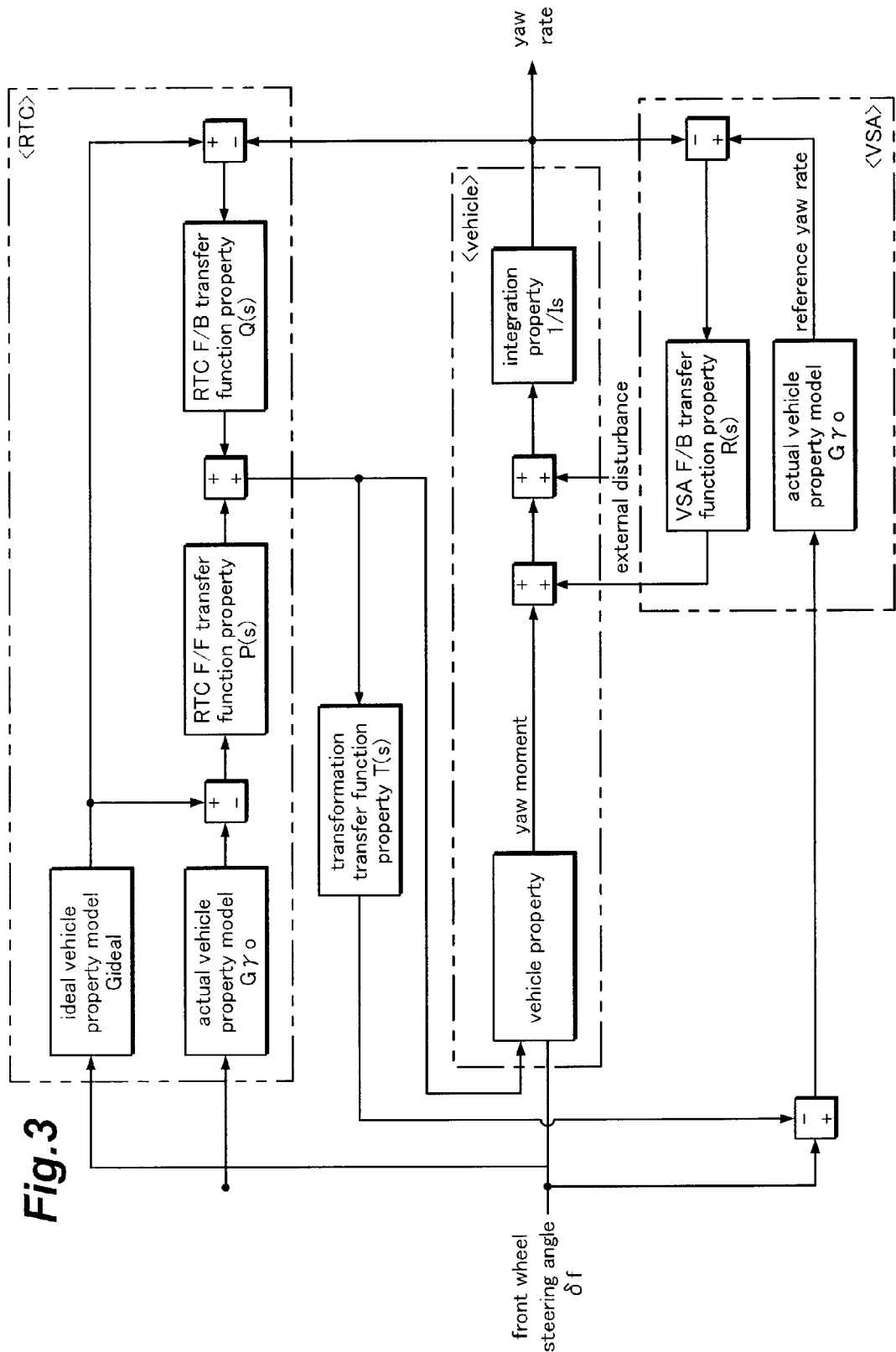
FIG. 3 is a block diagram of a vehicle motion stability control system embodying the present invention which combines a VSA device and a RTC device in an harmonized manner.

FIG. 3 is a block diagram of a vehicle motion stability control system embodying the present invention which is proposed as a means for resolving such a problem. In the illustrated embodiment, in addition to applying an added yaw moment given as outputs of the VSA and RTC (shown in FIGS. 1 and 2) to the yaw moment caused by front wheel steering, the output of the RTC is converted into a variable by a prescribed transfer function, and the output of this transfer function is deducted from the front wheel steering angle $\delta_f$ which is forwarded to the actual vehicle model for the VSA. This deduction may also be an addition depending on the way the sign is determined by the transfer function. It also means that the input front wheel steering angle $\delta_f$ for the VSA is modified depending on the thrust angle or toe angle which is given as an output of the RTC. As discussed earlier, the problem associated with the simultaneous activation of the VSA and RTC is caused by the fact that the control target for the VSA is a yaw rate response of the VSA when the RTC is not activated. The illustrated embodiment can resolve the problem without making any change to the structure of the VSA itself.

It is now considered what transfer function should be used for converting the output of the RTC. By rearranging Equation (1), Equation (3) given in the following can be obtained.

$$G_{ideal} \cdot \delta_f = G_{\gamma 0} \cdot \left( \delta_f - \frac{\frac{m \cdot l_r}{k_f \cdot l} V \cdot s + 1}{\frac{m \cdot l_f}{k_r \cdot l} V \cdot s + 1} \cdot \delta_r \right) \quad (3)$$

From this equation, it can be seen that, in the transfer function property of the vehicle model for the VSA, if $G_{\gamma o}(s) \cdot \delta f$ is changed into the following $$G_{\gamma 0} \cdot \left( \delta_f - \frac{\frac{m \cdot l_r}{k_f \cdot l} V \cdot s + 1}{\frac{m \cdot l_f}{k_r \cdot l} V \cdot s + 1} \cdot \delta_r \right) \quad (4)$$

the target yaw rate for the RTC can be obtained as an output of the vehicle model for the VSA even though the front wheel steering angle δf is apparently supplied to the vehicle model for the VSA. In other words, it can be seen that the transformation transfer function should be selected as T(s) as given in the following.

$$T(s) = -\frac{\frac{m \cdot l_r}{k_f \cdot l} V \cdot s + 1}{\frac{m \cdot l_f}{k_r \cdot l} V \cdot s + 1} \quad (5)$$

The steering angle (thrust angle or the steering angle as in a 4WS device) of the rear wheels was used as a control variable in the foregoing embodiment, but the toe angle of the rear wheels can also be used. More specifically, a toe angle θ can be converted into a thrust angle according to the relationship given in the following:

δr=K·αy·θ where K: roll stiffness determined by a tread and other parameters, and αy: lateral acceleration. By thus forwarding K·αy·θ to the transfer function property described above, a harmonization control with the VSA can be accomplished. A similar effect can be achieved also when the rear toe angle is used instead of the rear thrust angle for applying an added yaw moment to stabilize the behavior of the vehicle.

Thus, according to the present invention,
(1) The motion stability control of the vehicle can be executed from a normal range to an extreme range because the VSA and RTC can each perform its own functionality in a harmonized manner; and
(2) The harmonizing control can be executed without regard to the variations in the vehicle properties, and this substantially reduces the labor required in developing the vehicle motion stability control system for each vehicle.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A vehicle motion stability control system, comprising:
a first control device (VSA) that controls a distribution of a braking force and/or traction force of front and/or rear wheels according to a deviation between outputs of an actual vehicle model and an actual vehicle for a given front wheel steering angle;
a second control device (RTC) that controls a steering angle of the rear wheels using at least a front wheel steering angle as a control input; and
a harmonizing control unit that modifies the front wheel steering angle given to the actual vehicle model of the first control device according to a control output of the second control device such that a target control output for the second control device (RTC) is obtained as an output of the actual vehicle model for the first control device (VSA).

2. The vehicle motion stability control system according to claim 1, wherein the second control device (RTC) determines the rear wheel steering angle according to a deviation between outputs of an actual vehicle model and an ideal vehicle model for a given front wheel steering angle.

3. The vehicle motion stability control system according to claim 2, wherein the harmonizing control unit adds or subtracts a correction signal based on the control output of the second control device to or from the front wheel steering angle given to the actual vehicle model of the first control device.

4. The vehicle motion stability control system according to claim 1, wherein the control output of the second control device includes a yaw rate of the vehicle.

5. The vehicle motion stability control system according to claim 1, wherein the harmonizing control unit utilizes a transfer function T(s):

$$T(s) = \frac{\frac{m \cdot l_r}{k_f \cdot l} V \cdot s + 1}{\frac{m \cdot l_r}{k_r \cdot l} V \cdot s + 1}$$

wherein m=a vehicle mass, $l_r$=a distance of a rear axle from a gravitational center of the vehicle, $l_f$=a distance of a front axle from the gravitational center of the vehicle; V=a vehicle speed; l=a wheel base; $k_r$=a cornering power of rear wheels; and $k_f$=a cornering power of front wheels.

* * * * *